US012572959B2

(12) United States Patent
Wang et al.

(10) Patent No.: US 12,572,959 B2
(45) Date of Patent: *Mar. 10, 2026

(54) SYSTEMS AND METHODS FOR OPTIMAL AUTOMATIC ADVERTISING TRANSACTIONS ON NETWORKED DEVICES

(71) Applicant: ADELPHIC LLC, Irvine, CA (US)

(72) Inventors: Changfeng Charles Wang, Lexington, MA (US); Xin Chen, Irvine, CA (US)

(73) Assignee: ADELPHIC LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/789,473

(22) Filed: Jul. 30, 2024

(65) Prior Publication Data

US 2024/0386466 A1 Nov. 21, 2024

Related U.S. Application Data

(63) Continuation of application No. 15/337,562, filed on Oct. 28, 2016, now Pat. No. 12,051,091.

(Continued)

(51) Int. Cl.
*G06Q 30/0251* (2023.01)
*G06Q 30/0241* (2023.01)

(52) U.S. Cl.
CPC ..... *G06Q 30/0269* (2013.01); *G06Q 30/0267* (2013.01); *G06Q 30/0277* (2013.01)

(58) Field of Classification Search
CPC ........... G06Q 30/0244; G06Q 30/0275; G06Q 30/02; G06F 30/20
See application file for complete search history.

(56) References Cited

U.S. PATENT DOCUMENTS 8,175,950 B1 * 5/2012 Grebeck ............ G06Q 30/0275
705/7.29
8,676,929 B2 3/2014 Lazaridis et al.
(Continued)

FOREIGN PATENT DOCUMENTS

WO 2010039378 A2 4/2010

OTHER PUBLICATIONS

European Summons to Attend Oral Proceedings dated Jul. 20, 2022 for European Patent Application No. 16861017.8.
(Continued)

*Primary Examiner* — Saba Dagnew
(74) *Attorney, Agent, or Firm* — Gates & Cooper LLP

(57) ABSTRACT

A method relates to receiving, by a processing device executing a decision framework, a request comprising a plurality of attribute values associated with an opportunity to place an ad on one or more devices associated with a user, generating a state dynamic model comprising a plurality of state variables based on the plurality of attribute values associated with the opportunity, determining a plurality of utility functions, wherein each one of the plurality of utility function is determined based on at least one of the plurality of state variables, calculating a decision based on the plurality of utility functions, providing an ad to a selection of devices, tracking performance data for interactions with the ad, and dynamically improving performance of the system using the tracked performance data and a feedback loop.

20 Claims, 8 Drawing Sheets

Related U.S. Application Data

(60) Provisional application No. 62/248,886, filed on Oct. 30, 2015.

(56) References Cited

U.S. PATENT DOCUMENTS

| | | | |
|---|---|---|---|
| 8,930,991 B2 | 1/2015 | Philpott et al. | |
| 9,076,162 B2 | 7/2015 | McElfresh et al. | |
| 2009/0012903 A1* | 1/2009 | Subramanian | G06Q 30/02 705/80 |
| 2010/0082427 A1 | 4/2010 | Burgener et al. | |
| 2011/0054960 A1* | 3/2011 | Bhatia | G06F 16/958 715/243 |
| 2011/0145858 A1 | 6/2011 | Philpott et al. | |
| 2014/0129294 A1 | 5/2014 | Rosenberg | |
| 2014/0279046 A1 | 9/2014 | Sanada | |
| 2014/0280126 A1 | 9/2014 | Rash et al. | |
| 2014/0368429 A1 | 12/2014 | Aujay et al. | |
| 2014/0372091 A1* | 12/2014 | Larimore | G06F 30/20 703/2 |
| 2015/0088633 A1 | 3/2015 | Salmon et al. | |
| 2016/0203509 A1* | 7/2016 | Sharp, III | G06Q 30/0244 705/14.43 |

OTHER PUBLICATIONS

European Decision to Refuse a European Patent application dated Mar. 3, 2023 for European Patent Application No. 16861017.8.
European Examination Report dated Feb. 18, 2021 for European Patent Application No. 16861017.8.
Extended European Search Report dated Apr. 2, 2019 for EP Application No. 16861017.8.
PCT International Search Report and Written Opinion for International Application No. PCT/US 16/59601, mailed Jan. 12, 2017 (15 pages).

* cited by examiner

500

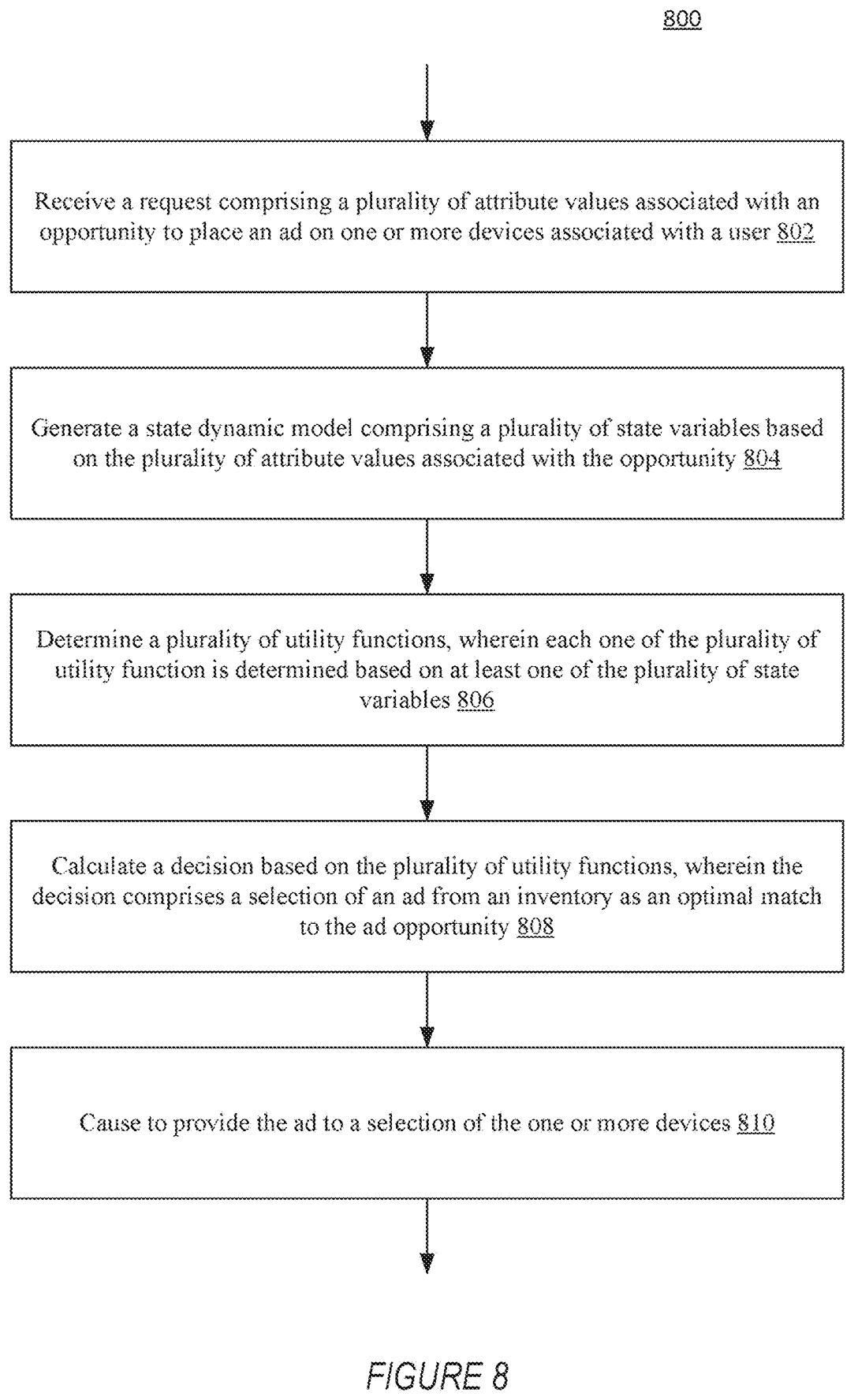

800

Receive a request comprising a plurality of attribute values associated with an opportunity to place an ad on one or more devices associated with a user 802

Generate a state dynamic model comprising a plurality of state variables based on the plurality of attribute values associated with the opportunity 804

Determine a plurality of utility functions, wherein each one of the plurality of utility function is determined based on at least one of the plurality of state variables 806

Calculate a decision based on the plurality of utility functions, wherein the decision comprises a selection of an ad from an inventory as an optimal match to the ad opportunity 808

Cause to provide the ad to a selection of the one or more devices 810

FIGURE 8

SYSTEMS AND METHODS FOR OPTIMAL AUTOMATIC ADVERTISING TRANSACTIONS ON NETWORKED DEVICES

RELATED APPLICATIONS

This application is a continuation under 35 U.S.C. § 120 of application Ser. No. 15/337,562, filed on Oct. 28, 2016, now U.S. Pat. No. 12,051,091 issued on Jul. 30, 2024, with inventor(s) Changfeng Wang and Xin Chen, entitled "Systems and Methods for Optimal Automatic Adertising Transactions on Networked Devices," which application is incorporated by reference herein, and which application claims priority from U.S. Provisional Application No. 62/248,886 filed on Oct. 30, 2015, entitled "Systems and Methods for Optimal Automatic Advertising Transactions on Networked Devices," the content of which is incorporated by reference in its entirety herein.

TECHNICAL FIELD

This disclosure relates to a networked platform to distribute transactable media items, in particular, to systems and methods to optimize and automate the buy and sell of advertisements (ads) on networked devices (e.g., mobile phones, tablet computers, personal computers, and networked televisions).

BACKGROUND

The wide spread usage of mobile devices such as mobile phones and tablet computers has changed how consumers interact with media items and with each other. Examples of media items consumed by consumers include television programs, social media, satellite radio, and mobile applications, text messages, Web content, and others. Increasingly, these media items are transmitted through networks and consumed through networked devices such as smartphones, tablet computers, personal computers, connected television sets (TVs), wearable gadgets, and others. Consumer interaction with media items are events that may present opportunities to deliver different forms of ads to users (also referred to as "consumers") on these networked devices, thus creating opportunities for advertisers and marketers to reach and engage consumers on these networked devices. Forms of ads may include text, graphic, audio, and video. Ads may be provided in these tangible forms along with media items to users. For advertising purposes, media items and devices may further be grouped into channels according to attributes such as contents and types of contents. Advertisers and marketers may also reach consumers according to channels.

The fast growing number of new devices and media channels, however, further increase fragmentation of the audience along the dimensions of networks, devices, and media channels, making it increasingly more complex and challenging for advertisers to allocate their budget and buy ad opportunities on media items that reach the right audience. Similarly, the publishers may also face the challenge to optimize the ad selling opportunities on media items and realize revenue when the ad opportunities are realized by consumers (e.g., click through).

BRIEF DESCRIPTION OF THE DRAWINGS

The present disclosure is illustrated by way of example, and not by way of limitation, in the figures of the accompanying drawings.

FIG. 8 depicts a flow diagram of a method for optimally providing an ad to user devices according to an implementation of the present disclosure.

DETAILED DESCRIPTION

Figure 1:
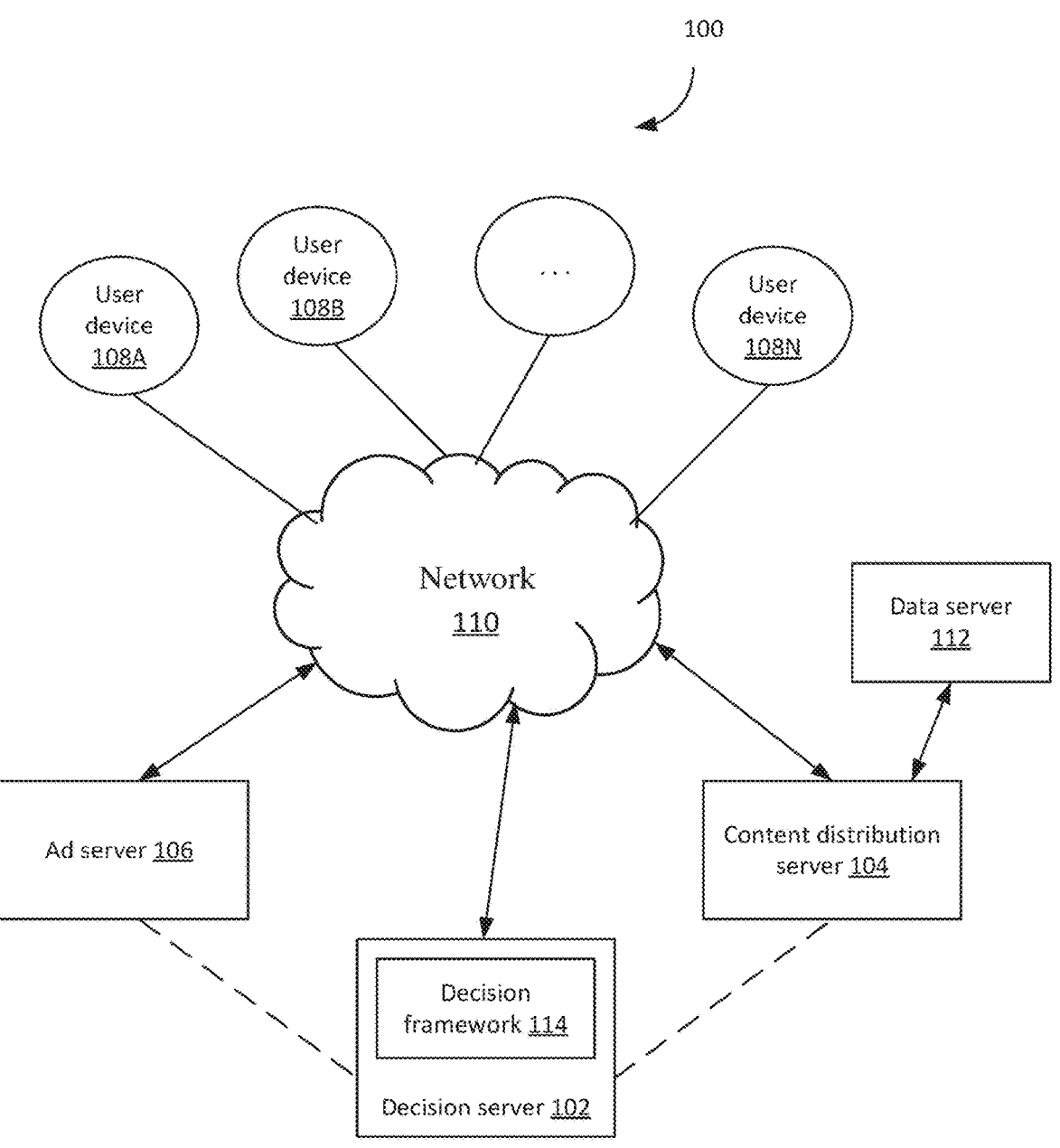
FIG. 1 is an illustration of networked environment 100 in which the system operates according to an implementation of the present disclosure.

Automation of advertising transactions through machine to machine interfaces, commonly referred to as programmatic advertising, on digital devices is a growing trend that provides major benefits for buyers and sellers, as well as users who use the networked devices. In the context of advertising market, a user (or a consumer) is an entity (such as a person) that has access to one or more networked devices through which the user may consume media content. A seller is an entity that may provide the media content to the one or more networked devices accessed by the user. The seller can be an owner or a publisher of media content. When a user consumes media content from the seller, the consumption poses an opportunity for advertisers to provide the user with various forms of ads. The seller may sell these ad opportunities in an ad market place. A buyer is an entity who looks to buy ad opportunities to place ads via seller's media contents on the networked devices used by the user. For example, a buyer can be an organization (e.g., a business or a non-profit organization) or an advertising agency that buys ad opportunities on behalf of the organization. In certain implementations, the seller may provide the ad opportunities to an advertising exchange (e.g., a computerized ad trading platform) on which the opportunities may be auctioned out to multiple buyers associated with the exchange. The buyers may bid on the ad opportunities made available by sellers. The buyer with the highest bid may be able to place its ads on these opportunities.

The buy and sell of ad opportunities can be executed between a seller computer and a buyer computer via the exchange using a programmatic transaction model. The programmatic transaction model provides a de facto standard protocol for machine-to-machine connections between buyers to sellers to make the access to the audience more scalable, thus providing a basic environment for programmatic transactions. The environment also helps make access to buyer and sellers more scalable, and enables per requests (or impression by impression) transactions. The automation and optimization of buying and selling decisions in this environment may help realize the benefits of the programmatic transaction model for buyers and sellers. There is, however, no systematic mechanism for automating and optimizing buying and selling decisions in a programmatic environment for the full range of networked devices and channels associated with these networked devices.

Conventional methods for making ad transaction decisions are limited to ad opportunities generated by Web searches and buying optimization on social networks portals on desktop computers. These methods are not suitable for ad transactions generated by mobile devices. Further, they do not work for programmatic outlets as these outlets were designed only for targeted, block-based buying of audience or media buckets provided by media providers. In particular, they are not applicable to impression-by-impression based programmatic ad buying. An impression in the context of online advertisements is a countable event of fetching an ad from a source at the time of a user interaction. The click of an online ad may not be counted as an impression because of the possibility of click fraud (e.g., robotic click). Each time an ad is fetched from its source, however, is counted as an impression.

Existing ad buying decision logics for desktop devices cannot be easily adopted to work for mobile devices because of differences in data involved in mobile decision making and the ad hoc nature of the mobile ad decision logic. Further, existing methods work with partial information, resulting in suboptimal solutions. For example, the optimization for desktop ads is typically at an individual campaign level, rather than at a level with finer granularity than campaigns such as impressions. An advertising campaign may comprise a series of advertisement messages associated with a common theme to be played on user devices over a period of time. A portfolio of advertising campaigns may include one or more forms of advertisements (e.g., video, banner, clickable etc.) associated with an advertising campaign. As a result, they are of limited helps for execution of individual campaigns, and provide little help in optimizing the total advertising objectives. In particular, they do not solve the problem of optimization and automation across devices and channels. The inability of optimization at the campaign portfolio levels also leads to suboptimal distribution of ad inventory for buyers (e.g., platform owners) and sellers (e.g., publishers) in the case of dynamic pricing (e.g., the varying prices during exchange auctions).

In addition, the lack of a formal decision framework in the current systems makes it hard to systematically improve the performance of the decision logics for different business objectives and doing so for a future time horizon. Current systems optimize only fixed metrics such as clicks, and are not easy to be adapted to campaign metrics other than clicks. Optimization is performed in a greedy manner rather than on a global level over a future time horizon. Further, optimization is typically on per ad or per campaign level, and involves manual processes to tweak model parameters. Partial information usage leads to sub-optimal solutions, and the heavy reliance on manual processes limits the performance and makes the systems inefficient to use and scale.

Implementations of the present disclosure provide a technical solution that enables automated ad transactions among a large number of buyers and publishers on networked devices based on a state system incorporating rules (decision logics) designed for ad delivery on both desktop and mobile devices.

The implementations allow each buyer of ads to optimize and automate its buying decisions with respect to measurable goals. The goals may relate to one or more ad portfolios on selected media outlets across devices and channels while allowing the buyer to maintain control on buying preferences. Further implementations may allow platform operators of ad marketplaces to optimize and automate the buying and selling process with respect to measurable metrics. The optimization takes into account all variables affecting decision outcome and practical constraints, and the result is systematically improved when new data becomes available.

Buyers are connected to one or more media outlets, such as advertising exchanges, ad networks, or publisher media portals. The connection is typically through an application program interface (API), and media content is booked as individual requests (e.g., via ad exchanges), or booked as buckets of requests (e.g., via ad networks or big publisher portals). Transactions can be performed with different pricing models. A utility function (referred to as utility) may be used to measure effects of ad placement as a function of various advertising metrics. The utility can be customized to specific business goals through a configuration data file, and to controls of the buying preferences. These preferences may be specified as a set of setup and control parameters which serve as preconditions and constraints for optimization. These control parameters can be specified through a user interface, which can be a graphical user interface for human operators or a programming interface for machines.

The results of the decision may include how to allocate a buyer budget to different channels and devices; when, and which device or channel to buy a particular an advertisement opportunity to a user; what is the proper price; in the case of a portfolio of campaigns, which ad and which campaign to answer a particular ad request; in the case of bucketed ad sales, which buckets and what price to buy for each campaign. A bucket is a set of ad opportunities addressable by different parameters for targeting and other purposes.

The factors affecting the outcome of the optimization may include media outlets, devices, media channels, pricing and transaction models, targeting variables (involving user, media, location, time, time of the day, or any factors that may impact the outcome of the campaign), inventory granularity (impression based vs targeting variable based), block based, creative types, campaign goals, and inventory availability. Implementations of the present disclosure may include a decision framework that captures these factors involving campaign goals by incorporating these factors in the requirement and dynamics of the decision framework. The performance of the decision framework can be tracked, measured, and improved dynamically as the ad campaign (or campaign portfolio) progresses.

Various campaigns goals are captured as utility functions (referred to as utilities) to be optimized for a specified period of time. Different utilities can be defined for buyers, sellers, and media content providers. The utilities may include budget constraints, media inventory, bidding price movement on each ad request, likelihood of user actions, competing campaigns in the portfolio, and user actions. Other factors such as media characteristics, ad characteristic, user behavior in current sessions, past conversion behavior, past purchases, communication network characteristics, end user devices, device locations in in the physical world, time of the day, day of the week, can be modeled as observable variables in the decision platform. Ad requests may be generated by different media channels, communication networks, devices, and location in the world. The decision framework may make optimized decisions with respect to making a bid or not, when to bid, how much to bid, and what price to bid. For the framework to be efficient, non-performing inventory for each ad may be identified as early as possible. For each ad request and each campaign, there exists a format of decision that is optimal given the level of uncertainty in user interaction outcomes. The outcomes can be explicitly controlled for each campaign as well as for the campaign portfolio.

Implementations of the present disclosure can serve as a centralized buying portal for buyers to purchase from all possible media outlets and devices and content channels. The system provides automated budget allocation, attribution to channels and devices, as well as decisions for buying media from individual outlets. Another implementation may include a platform to serve as a centralized media buying service to a large number of buyers (e.g., advertisers).

Figure 7:
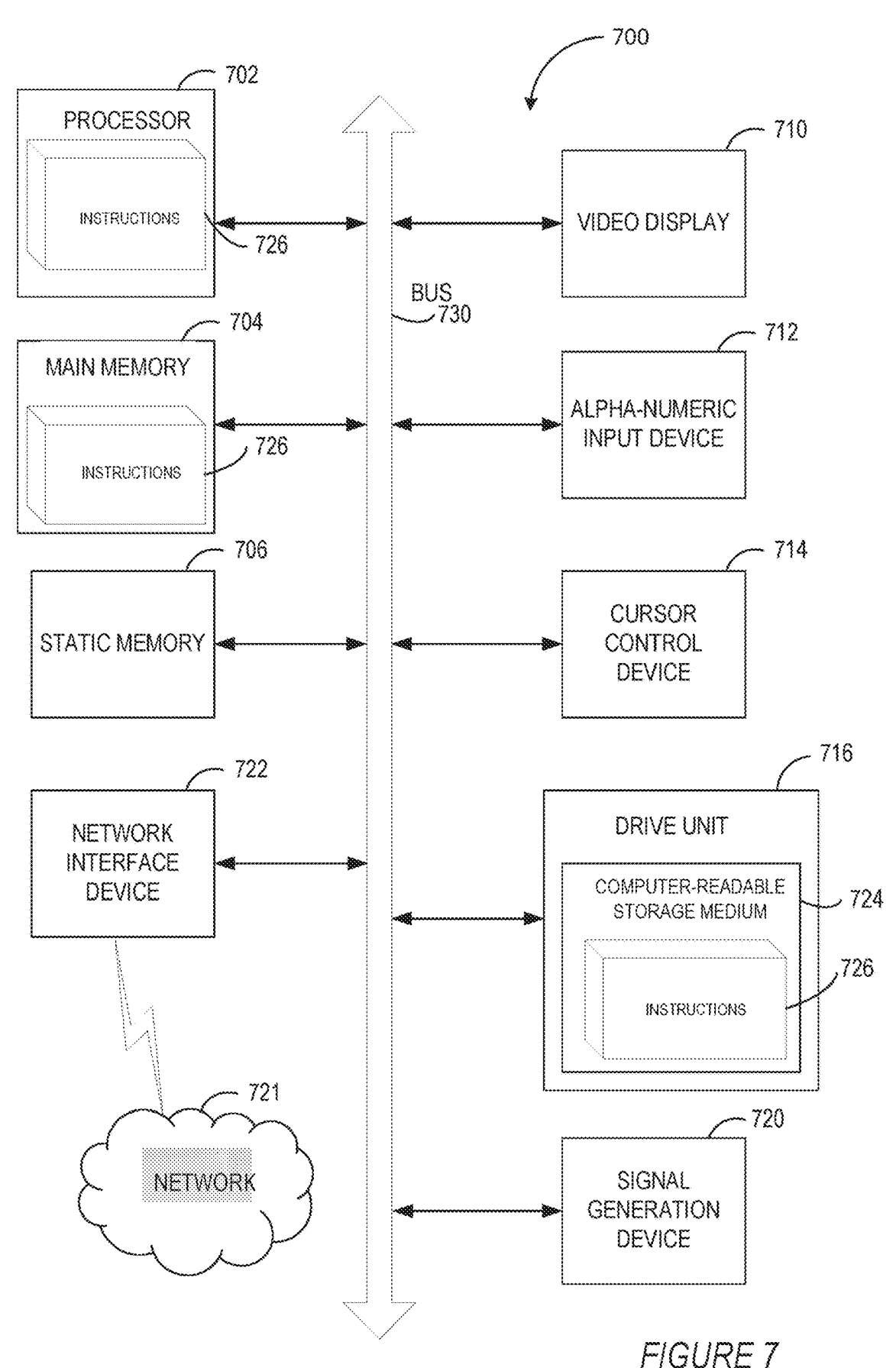
FIG. 7 is a block diagram illustrating an exemplary computer system, according to some implementations.

FIG. 1 is an illustration of networked environment 100 in which the system operates according to an implementation of the present disclosure. Referring to FIG. 1, an ad transaction environment 100 may include a content distribution server 104 for a publisher to distribute media contents, an ad server 106 for advertisers to serve ads embedded in the provision of the media contents, user devices 108A-108N for users to consume the media contents via a network (e.g., the Internet) 110. Decision server 102, content server 104, and ad server 106 can be a computer system as shown in FIG. 7 that includes hardware processors programmed to perform certain tasks as described herein. The user devices 108A-108N may include smartphones, tablets, personal computers, connected TV through communication networks. The communication networks may include components such as the Ethernet cable, Wi-Fi, satellite networks, or wireless operator networks, and these network components may further be connected to the Internet. Users may receive media contents provided by content publishers through content distribution server 104. Content distribution server 104 owned by a content publisher may be, via network 110, connected to ad server 106 that provides ads associated with the media contents. A data server 112 may be connected to content distribution server 104 to provide different types of data relating to users, contents, locations of user devices, and other types of information relating to ad opportunities.

A user may use user devices 108A-108N to send requests to content distribution server 104 for media content. A user request may present an opportunity to serve ads to users along with the media contents delivered to the user devices. Multiple user requests (either from different users or the same user) may be aggregated by one or more of the ad networks, advertiser exchanges, or by large publisher portals, and sold to advertisers that may seek to buy advertisement opportunities.

A user may use one of more of devices 108A-108N connected to network 110 at different times to access the same or different media content. An advertiser may desire to advertise to the same user using these devices in the correct media context and moment, while minimizing the cost to serve the ads. The publisher may desire to find the right advertisers to buy their contents and maximizing advertise revenue. Buyers and sellers share the common goal of a simplified process and reducing operational cost.

Buyers (or advertisers) may buy media and audience from different outlets including direct publisher portals (e.g., FACEBOOK's social networks), advertising networks, and advertising exchanges. Each of these outlets may offer different ways to address or target an audience with their own pricing and transaction model. Advertisers need to decide where to spend budget, on what channels and devices, how to buy media, how much budget spend on each of these channels, and how to target and optimize the audience that they want to reach by optimizing the buying decisions against different metrics. Specifically, they need to make decisions for different time horizons. For example, the decisions may need to be made in milliseconds for real time bidding (RTB) impressions. In addition, advertisers need to make the decisions of what data to use to target audiences, where to get the data, and how effective the data are. Decision server 102 may provide the decision logic to make optimized decisions in real time for buyers and sellers.

Decision server 102 may include a processing device (e.g., a central processing unit (CPU)) and memory to run a decision framework 114 that is a software application for helping buyers to make buy decisions and helping seller make sell decisions on ad opportunities on networked devices and media channels. The decisions are optimized against measurable metrics while providing control to operators of the system. Decision server 102 may have access to various ad inventory sources via application interfaces.

Advertisers and publishers need to make a set of decisions that may result in one or more ads being displayed to an ad impression opportunity from a given device or channel. Advertisers (i.e., buyers) may need to make a set of decisions such as: which user should be contacted from what outlet, device and channels; how much price to buy an ad opportunity; how to allocate the budget to each device or media channel, and user profile; who the device and channel combinations should be used for a campaign goal; how to target and retarget a user. Publishers (i.e., the sellers) may need to make decisions such as: which impression to sell at what sales channel and at what price. Decision framework 114 running on decision server 102 may automatically make these decisions for the advertisers and purchasers.

In some implementations, ad opportunities from the sources may be grouped into buckets according to parameters that are relevant to ad performance. The bucketing parameters may include user data, context, location, device, interaction events. The bucketing parameters can further be used to predict metrics of ad interactions. Since a user may consume media contents at random times, the ad opportunities are random events.

Predictions may be used to score opportunities for each ad, and generate optimal decisions logics, which can then be used to make decisions for different time horizons, including real-time decisions.

Decision framework 114 for optimizing multiple decisions with uncertainty may systematically create, validate, and update decision logics based on empirical evidence for all devices and channels. The decision logics may optimize an objective or utility in relation to buyer's goals and/or seller's goals, resulting in automated process with minimal operator intervention. The decision logics may take into account the predicted user reactions, competition for the opportunity, price of the opportunity, prediction of inventory availability, budget, and other data points.

Decision framework 114 may capture all the complexities involving campaign goals and dynamics of the environment, and reduce the decision process to trade-offs between two explicit optimality goals. These goals can be controlled by two variables that may be optionally set by advertisers through a user interface. The decision framework 114 may also include information relevant to ad performance as the information becomes available, dynamically generating optimal decisions. Optimality of the decision logics can be validated, measured, and improved as the campaign progresses. Furthermore, optimality trade-offs can be set at individual campaign level as well as at campaign portfolio levels, and the optimal combination of devices and channels can be learned in the process based on empirical data.

In one implementation, advertisers may desire to buy inventory from selected devices to reach a performance goal. Buyers need to make decisions on whether or not they want to buy a particular opportunity for each ad for a given set of campaign goals and total budget. The decision may include the price and the number of impressions. Specifically, they need to make decisions at different time horizons and with different data attributes that describe the opportunity. Decision framework 114 may help the buyer make these decisions. The buyer may select the performance utility or metrics via a user interface. The utility may include price or total number impressions, along with other controls such as total budget and time duration. With the utility input, the decision framework 114 may execute a set of processing steps including finding the appropriate parameters to use for modeling the state and state dynamics of the model for the campaigns, creating and periodically updating the optimal decision logics that may determine which ad opportunity to bid, bid price, and execute the logics on each opportunities to reach the goals.

In another implementation, advertisers may decide on a total budget and decide to use three types of devices, such as mobile devices and connected TV, and desktop computing devices to collectively promote a product in a campaign. The decision framework 114 may determine the optimal allocations of budget to each type of devices, along with buying logics for each device types. As more data becomes available, decision framework 114 may further decide the optimal combination of device types and sequence of interactions with each user, thus providing a systematic way to optimize cross-device campaigns. It is understood that device types are used only as an illustration. The same process would be applicable to other devices, device types, channels, and mixture of them.

Optimization goals may be quantified and measured, and interactions may be tracked. Examples of buying decisions may include optimization of reach, performance goals, and minimization of cost. Decision framework 114 may use the tracked performance data, in conjunction with ad opportunity bucket variables, and others, to form a feedback loop to create new decision logics.

System may be built to execute the generated decision logics so that the same workflow and user interface may be used to control and execute decision process relating to any channels and devices that are connected over networks. The decision process may be optimized and automated so that buyers or sellers only need to specify the right level of trade-offs and business constraints, and the system may carry out all the rest of the decision making. Furthermore, decision framework 114 provides operators all the information and systematic mechanism to customize decisions and injecting, testing, validating, and optimizing decisions based on a priori knowledge that may not be captured by empirical observations.

Figure 2:
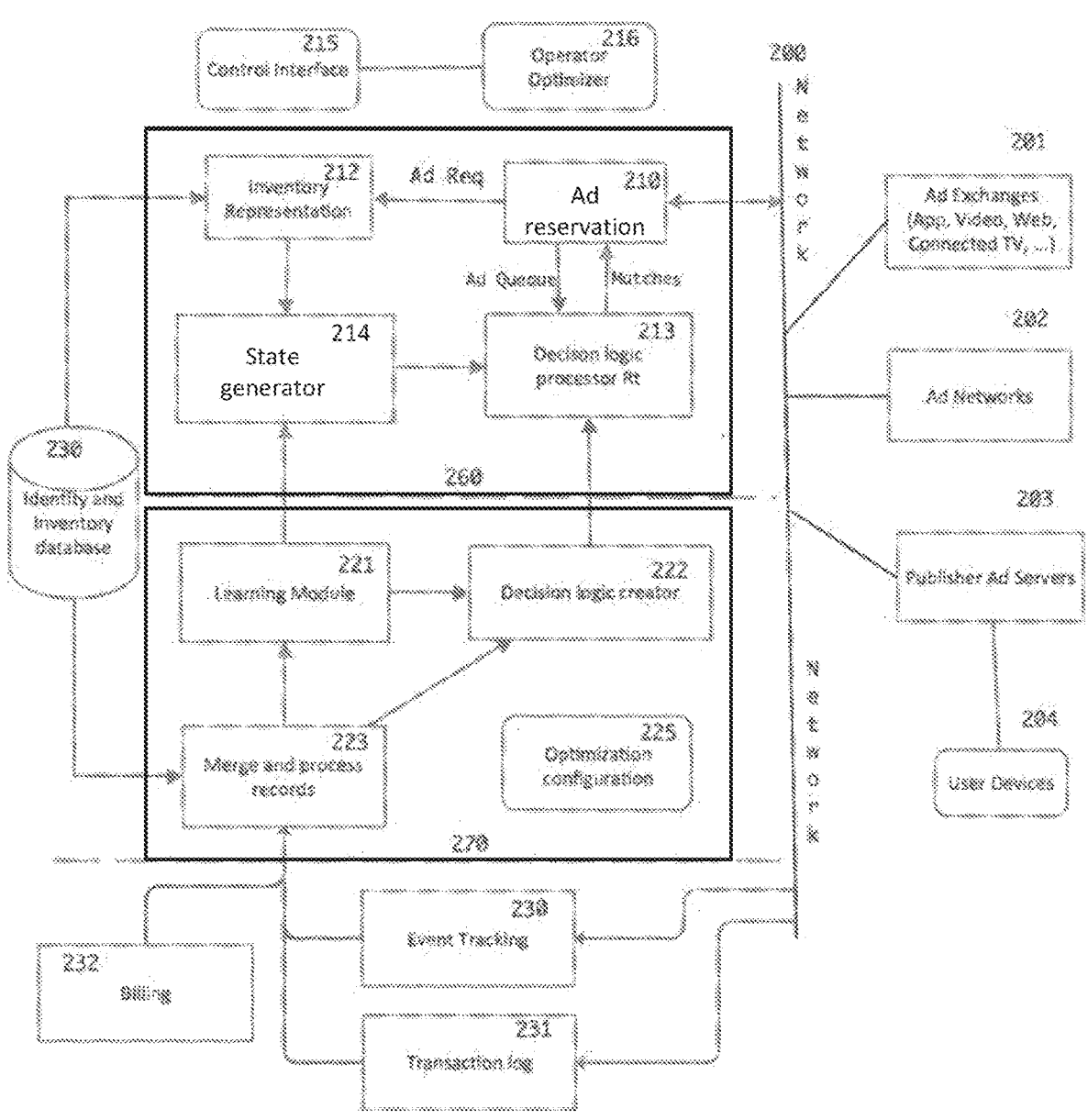
FIG. 2 illustrates connection of buyers and sellers on multiple devices and media channels according to an implementation of the present disclosure.

FIG. 2 illustrates connections of buyers and sellers on multiple devices and media channels according to an implementation of the present disclosure. Referring to FIG. 2, the decision framework may include a real-time processing component 260 and a batch processing component 270, and an event tracking component 230. These components may form a closed-loop optimal decision system for real-time buying and selling of ad opportunities.

The decision framework may be connected, through a network 200, to user devices 204, a publisher ad server 203 (e.g., as a component of content distribution server 104 as shown in FIG. 1), an ad exchange 201 and an ad network 202. Ad exchange 201, ad network 202, and publisher ad server 203 can provide a marketplace for providing ads for ad opportunities on user devices 204. The connection between the decision framework and ad exchange 201, ad network 202, and publisher ad server 203 may be accomplished by employing an application program interface (API) following a protocol (e.g., Open RTB, or a proprietary protocol).

The decision framework may be coupled to a user interface including a control parameter interface 215 and an operator optimizer interface 216 that may allow an operator of the decision framework to specify certain parameters associated the operation of the decision framework. In one implementation, the operator may use control parameter interface 215 to specify a set of input parameters that may quantify different business goals and/or the behaviors of the system. The decision framework may compute the optimized decision (for one or more buyers and/or sellers) based on empirical measurements acquired from historical data. For example, control parameter interface 215 may receive parameters such as, for example, performance parameters of average click rate, average conversion rate, revenue goal, margin goal, profit margin tolerance, ad price range, ad placement priorities, an overbid margin, a throttle rate, and trade-offs among metrics (e.g., performance and reach, total utility, budget, and others). Control parameters may also specify run-time customization of utility for buying or selling purposes, input on required and optional parameters, and custom optimization rules.

The operator may optionally use operator optimizer interface 216 to adjust the input parameters to the decision framework. For example, the operator may use operator optimizer interface 216 to combine existing knowledge to customize optimization rules. This may be helpful, for example, when there is not enough empirical data or when new campaigns are started for buying or when inventory is completely new and unrelated to known sources. The operator may further optionally use a module 216 to specify a priori rules for transact decisions, and experiment with different settings of optimization using the data elements provided by the system.

Based on the input parameters received at control parameter interface 215 and rules at operator optimizer interface 216, the decision framework may make automated and optimized ad buy and/or sell decisions using real-time processing component 260 and batch processing component 270 as described in the following.

In one implementation, real-time processing component 260 may further include an ad reservation module 210, an inventory representation module 212, a decision logic generator 213, and a state generator module 214. Ad reservation module 210 may take ad requests, via network 200, from ad exchange 201, ad network 202, or publisher ad server 203. These ad requests may be generated in response to a user event at user devices 204 for media contents provided by a publisher server. Thus, these ad requests may represent opportunities to deliver ads to user devices 204. Ad reservation module 210 may also manage ad reservation (previously reserved ads designated for certain types of ad requests), filter and target the ad reservation against the ad requests, and serve ads matched with ad opportunities.

Ad opportunities may arise as a result of user events, such as user interactions through user devices 204 with content distribution servers. Ad opportunities may also arise from ad exchanges 201 and ad networks 202, or from different networks such as the Internet, operator network, and cable networks. Ad opportunities may be at individual request level or bucket of request level. In either case, they may be represented uniformly for the entire sources through a universal representation module 212. In one implementation, universal representation module 212 may create a vector containing parameters associated with an ad opportunity. The parameters in the vector representing the ad opportunity may include a user identifier uniquely associated with a user, a media identifier uniquely associated with media content, a location identifier associated with the location of the user device, and ad spot identifier associated with a spot for placing an ad. The user identifier may further be associated with at least one of a set of user device identifiers or media channel identifiers. The media identifier may be associated with at least one of a publisher, an App, a website, a video source, or a media content segment. The vector may further include data attributes identifying one or more ad spot placement positions (e.g., a screen position or a video frame position). The vector may also contain parameters representing ad format and ad performance and decision making, such as user data, contextual data, location, device, networks.

In one implementation, the ad transaction decision may be modeled as a state system that generates decision output based on the input from inventory representation module 212 and states generated by state generator module 214. State generator module 214 may create states in a state-space representation. The states may include information needed by real-time processing component 260 to make ad transaction decisions. The state may include state variables representing the ad and ad opportunities such as, for example, attributes for addressing the ad opportunities in real-time, ad transaction data, and event tracking data for a given time window. The state may also include variables representing predictions on various events in relation to user interactions with the ads such as probability to click an ad, probability of conversions (e.g., app download), and predictions on traffic at different bucket indexes (e.g., per site, App, or groups).

Decision logic processor module 213 may receive state information of the system from state generator module 214 and input parameters from ad reservation module 210 to calculate a decision as an output. The calculated output may include budget allocation for the current channels or devices when multiple devices and channels are involved. To make decisions for a request, the output may include the selected ads that match the request, along with bidding prices in case of RTB traffic. In another implementation, the ad reservation module 210 may be a separate ad selling system such as a media portal or ad network, and decision logic processor module 213 outputs optimal ordering information involving bucket specification along with amounts of orders, price and other information in association with the order system. In each case, the decision logic processor module 213 may select a set of matches, assign a score to each of the ads in the qualifying ads, rank the ads accordingly, and pick the final ads based on the weight as output to ad reservation module 210.

Runtime decision logics executed in module 213 may be expressed in terms of one or more state variables and state dynamics variables that are made available at time of making a decision via state generator module 214. A state of a system includes a minimal set of variables that are used to describe and address ad opportunities and ads, and state dynamics specify how these variables are related together for the purpose of the decision-making. The state of the system includes all the variables that affect the outcome of the ad system, and system dynamics describe details of how the variables interact with each other in affecting the ad performance, and buying and selling decisions. The system dynamics and even what variable affects the outcome may behave in a random fashion. The types and values of state variables may be made available through user identity and data management system 230 via a user interface.

Batch processing component 270 may be coupled to real-time processing component 260 to provide further support. In one implementation, batch processing component 270 may include a learning module 221 coupled to state generator module 214, a decision logic creator module 222 coupled to decision logic processor module 213, a merge and process record module 223, and an optimization configuration module 225. Learning module 221 may include a learning system that empirically learns the state dynamics from the historical data. The state and state dynamics information learned by learning module 221 may be fed to decision logic creator module 222 for creating decision logics.

Decision logic creator module 222 may periodically create, update, and evaluate the runtime decision logics executing on decision logic processor module 213. Decision logics generated by decision logic creator module 222 may include a set of rules created based on historical transaction data stored in transaction log 231, billing data 232, and ad event tracking system 230. Thus, decision logic processor module 213 may rely on the decision logics (or rules created by decision logic creator module 222), state and state dynamics generated by state generator module 214, and input from ad reservation module 210 to determine ads that match ad opportunities. Merge and process record module 223 may collect data from event tracking module 230, transaction log 231, and billing module 232. The collected data may be merged and processed at different levels as required by learning module 221 and optimization module 222. Optimality and detailed behavior of decision logic may be customized for each ad or groups of ads in relation to any addressable inventory unit, and may be controlled by specifying a set of parameters using control configuration module 225. Examples of control configuration 225 are utility selections for different ad or ad groups, time windows, inventory source preferences, etc.

Figure 3:
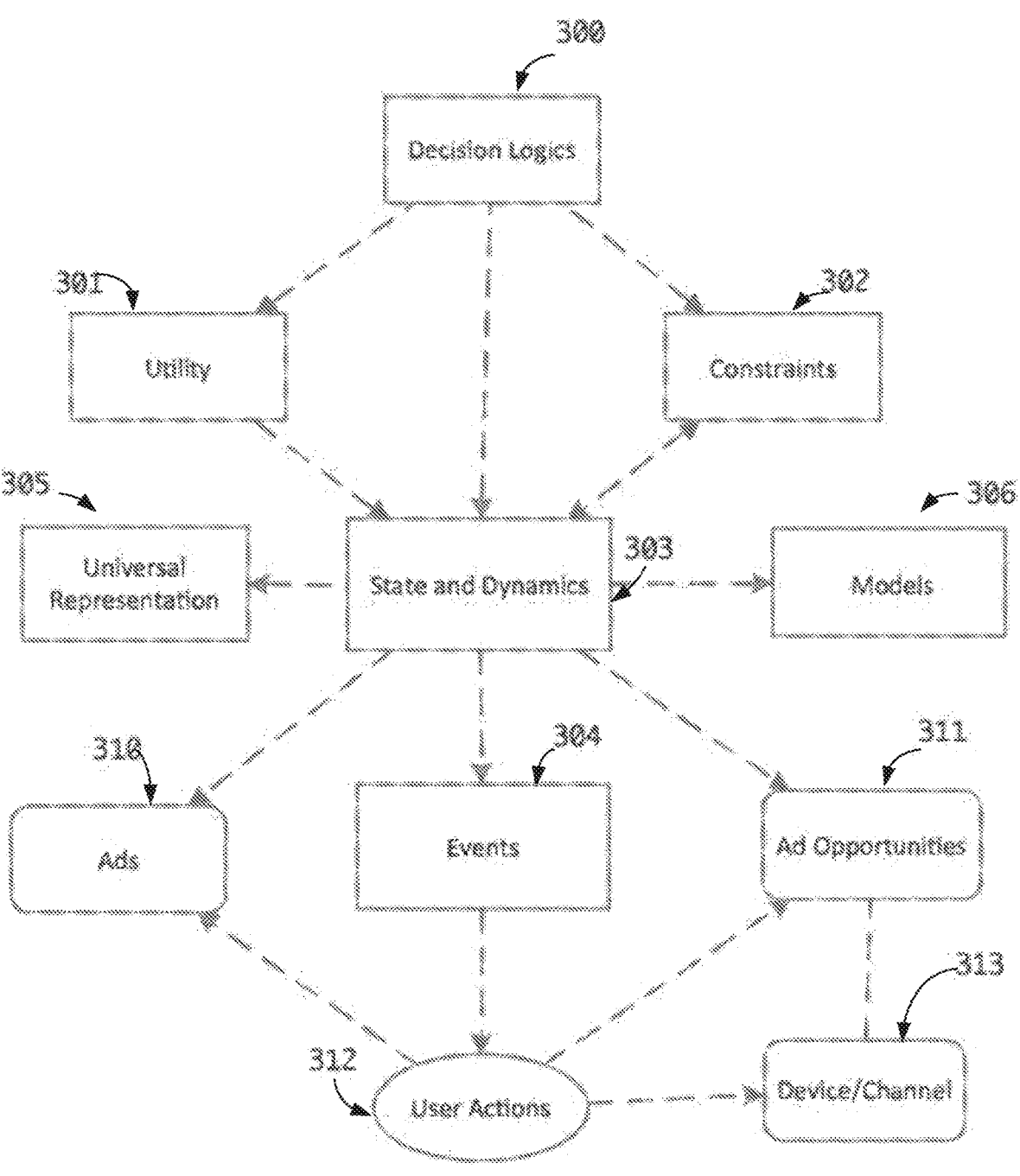
FIG. 3 illustrates the optimal decision framework according to an implementation of the present disclosure.

FIG. 3 illustrates the optimal decision framework according to an implementation of the present disclosure. Referring to FIG. 3, the optimal decision framework illustrates aspects for representing and creating optimal decision logics based on empirical data for buying and selling media, captures the state and system dynamics, and generates the optimal decision.

In the current pervasive communication mode, a same end user may use multiple user devices to consume media. Advertisers may need to identify the right combination and sequence of user devices and media channels to provide ads to these user devices. When there are many potential fits to the request, a platform operator may need to make decisions regarding which ad buyer and which ad should be given the opportunity. The platform operator may be an entity that operates the decision framework on behalf of clients to make the optimal decisions. The goals of platform operator may be different from that of ad buyers, depending on the pricing model between the buyers and platform operators, and that of supply sources.

Each ad buyer may have different campaign goals. Buying decisions may affect whether a buyer's campaign goal can be achieved. The goals may include whether they reached the right users, whether there are enough such users, and how the users respond to the advertising message, and total spending to acquire the ad opportunities. Buyers may have varying campaign goals that they want to achieve and at the same time, minimize spending within a pre-specified budget.

The complexity as a result of numerous combinations of these possibilities quickly exceeds human operator's ability to make optimized decisions. Indeed user responses to advertising are typically random, and existing systems do not address the full complexity by considering all factors.

Implementations of the present disclosure employ a decision framework to create optimal decision logics for a variety of networked devices, channels, and combination of devices and channels that work together to achieve advertising goals. Decisions may be completely automated based on the decision logics, leaving human operators with control to control the behavior of the system. The framework is flexible enough to allow the operator to introduce a priori knowledge that is not captured by empirical data.

There are many factors to influence the outcome and to optimize against. For example, the factors may include media outlets, media channels and types, types of user devices, targeting variables such as user intent, behavior, demographics, and/or, media channels, pricing and transaction models, inventory granularity (impression based vs bucket of impressions), creative types, time of the day, inventory availability, pricing models, inventory availability, competition on the same inventory, frequency of exposure, media context, context, location of the user, and others.

Referring to FIG. 3, decision logics 300 (e.g., created by decision logic creator module 222) may be employed to make ad buy and/or sell decisions based on utility 301, constraint 302, and state and state dynamics 303.

Various campaign goals may be measured as utility functions (referred to as utilities 301) that may be optimized for a given time horizon. Utilities may measure goals of advertisers, ad agencies, ad service providers, and media content owners. Utilities 301 may subject to certain constraints 302 such as, for example, the budget constraint associated with advertisers. State and state dynamics 303 of a state-space system may be employed to model different variables associated with the decision framework. For example, the dynamics of the state system may be modeled according to the dynamics of media, inventory, and bidding price movement with respect to the ad opportunity vector that describes the ad inventory and ads on each ad request, the likelihood of user actions, competing campaigns in the portfolio, etc. Ad opportunity vector may include observable variables such as media identifiers, source, characteristics, ad characteristic, user behavior in current sessions, past behavior (e.g., user intention, searches, past purchases, past interactions, user device location etc.), and communication network characteristics (e.g., end user devices, location in in the physical world, time of the day, day of the week, etc.). Ad requests may come from different media channels, communication networks, user devices, and locations. Optimal decisions may be made as to whether to bid on an opportunity, when to bid, how much to spend on a bid, and what price to bid. For the system to be efficient, non-performing inventory for each ad needs to be identified as early as possible. For each ad request and each campaign, there exists a format of decision that is optimal given the level of uncertainty in user interaction outcome. The outcome can be explicitly controlled for each campaign as well as for the campaign portfolio.

Further details of frameworks are summarized and explained in the following.

1. The state and dynamics module 303 may characterize the state of the ad system with a unified representation 305 using an ad opportunity vector for all digital devices and media channels and metrics, ads at different levels of granularities (e.g., levels at creative, line order, or campaigns, size, form, type of ads (such as banner, interstitial, video, and others)), and may model state dynamics using a set of probabilistic scores to predict outcomes with respect to user events 304 associated with each ad and ad opportunities. The user interaction models are used to summarize all the relevant information relating to ads and ad opportunity information. The user interaction model may be generated as a function of inventory vector including variables such as user profiles and observed behavior interactions, media context, location, devices, network, and other data.

2. Utilities 301 may be used to measure user interaction events and measure goals associated with one campaign or a portfolio of campaigns on one or more user devices across media channels. The utility measured at a future time may be discounted from full value. Users may perform user actions 312 on user devices that may create ad opportunities 311 to be matched with ads 310 as results of the decision framework.

3. An event tracking module 304 may specify, track, and measure a set of ad events at user level and/or campaign levels across devices and media channels to monitor performance, and use the monitor performance to calibrate and build user interaction models 306.

4. Constraint module 302 may specify business requirements as a set of constraints relating to ad opportunities, ads, metrics thereof, and modeling variables.

5. Optimal decisions in the form of matching ads to opportunities may maximize (or minimize) utilities 301, computed at different granularity of states over an appropriate time horizon, while satisfying constraints 302. Maximizing (or minimizing) utilities 301 may include determining an extreme value for at least one of utilities 301 with respect to states. Different utilities 301 associated with campaign portfolio or a specific campaign level can be used in making the optimal decisions. Controls are provided to optimize utilities for each individual campaign and for the campaign portfolio.

In one implementation, a state-space representation including state and state dynamics may be used to model ad opportunities. Each ad opportunity may be associated with a user interaction with a media context owned by a publisher. The user may interact with certain networked device from a physical location at a time. The complete information representing such an ad opportunity can be identified by an inventory vector i and an ad vector j. Thus the vector representing state and state dynamics 303 may comprise vector (i, j), a set of events $\{X_{ij}\}$, and state dynamics may be described as a probability score associated with $X_{ij}$. The probability score may be calculated using probabilistic models. Each ad request received from the publisher may be modeled as a random draw of ad opportunity i at the time t. The ad opportunity i may be described by a set of attributes. These attributes may contain the information gathered at the time a buying decision is to be made by a buyer or a selling decision is made by a seller. Specifically, attributes associated with index i may include a set of parameters including user identifier, user device identifier, media context information, physical location information, and time of interactions, and ad spot. Each type of the parameters can be identified through a unique identifier, and details can be described using a set of parameter values. An ad spot (a time or space reserved for an ad in a media) may be described by parameters denoting an ad creative (including, for example, ad type, size, price, and other information). A user identifier may specify user demographics, intention, media usage, purchase and other behavior. The media context can be associated with one or more taxonomy and ontology. Ad opportunities can be bucketed by one or more of the parameter values. For example, a bucket of ad opportunities may be associated with a particular demographic of users using a particular type of user devices.

A collection of ads including one or more ads from different campaigns and advertisers can be determined to match an ad opportunity associated with a request and be served to the request. The information regarding an ad may be identified by an index of j. In particular, the ad can be a creative, line order, or a campaign, and owned by advertisers, and each of these data entities (creative, line order, or campaign) can be further described by other data attributes.

State dynamics may be used to create a model describing how to serve an ad to an ad opportunity associated with ad request r, events of interest (X) that are associated with each ad j. Ad request r and user events are intrinsically probabilistic. In one implementation, ad opportunity associated with each ad request r may be modeled as a draw of random events according to a probabilistic distribution $P(i, t)$, the amount of traffic from inventory sources, $A_i(t)$, where event X is modeled as a likelihood function $XRate_j(r)$, and clearing pricing of ad request is denoted as $CP_j(r)$. In particular, $XRate_j(r)$ may be modeled as $XRate_j(r)=Prob(X_j|r)$, i.e., the probability that event X occurs associated with serving an ad to a request r, which is in turn completely described by variables associated with ad opportunity i and ad j. Thus the function $XRate_j(r)=XRate_{ij}$, where r can be a sampling of i with a probability of arrival represented as $P(i, t)$. When the probability model takes into consideration i, $XRate_{ij}=Prob(X_j|i)$. Furthermore the relation between the clearing price, bid price $BP_i$, and winning rate can be established as $Prob(WinTheBid|i, CP_i)=WinRate_i(CP_i, Bp_i, t)$ for each time instance t. For each given i, the WinRate may also determine the total number of requests that can be won.

Quantities of $XRate_{ij}$, $A(i, t)$, $WinRate_i(t)$, $CP_i$ may be expressed in terms of data attributes for describing the inventory i and ad j. In one implementation, for real-time bid (RTB) settings, ad opportunity i may be associated with all types of user information such as, for example, behavior data comprising user intention, past conversions, and specific media the user is currently using, and recent activity paths over different media properties or content channels, media contextual categories, semantic, physical location, devices, and others. In some implementations, i can be used to denote all variables that might be relevant and accessed in association with the ad opportunity at the point of decision. For example, in some implementations, the data attributes associated with index i may further contain variables involving previous actions X in association with the user behind the current ad opportunity. For inventory received from ad networks, if the available data are associated with bucket variables, the media variables may be bucket variables that are accessible at time for making decisions.

In one implementation, model 306 can be created as following. Specific representation format and values of XRateiJ, $A(i, t)$, $WinRate_i(t)$, $CP_i$ can be created by selecting proper hypothesis classes and model creation algorithms in the context of statistical modeling and machine learning. The relevant predictors can also be selected as part of the process to build, validate, and test the quality of the models.

One issue in building the state dynamics is potentially high dimensions in the data. For example, there might be millions of users and many millions of web sites and apps. Data may be unavailable for most of inventory along the product user and media dimensions. This lack of data may be leveraged for practical modeling building. Using XRate as an example, $i=(m, l, u, t)=(s, u_{sp})$ with $(m, l, u, t)$ denoting media, location, user, and time vectors, s denoting the common variables that are independent of users, and $u_{sp}$ denoting user specific data. For example, a model of the following form may be built with g( ) and h( ) being functions built on s and $u_{sp}$ independently:

$$XRate_{ij}(t) = f(g(s), h(u_{sp}))$$

The process is illustrated using XRate(i), but it should be understood that the same principle may apply to other metrics. The following algorithm demonstrates how a function may be learned from historical data:

A processing device may execute the decision framework to 1. select a request in a given time horizon $[-T\_I, 0]$ following a request probability distribution D, and set time granularity;
2. aggregate vector $\{(XRate, s, t)\}$ by aggregating out user dimensions to obtain aggregated data $g(s)$;
3. build a user-level model on aggregated data $XRate_{ij}(t)=g(s)$
4. aggregate performance data at the user level on D to create data set at individual user level with variables $(Xrate, U_{sp}, t)$;
5. Create dataset $\{r, g(s), h(u_{sp}): \gamma \in D\}$ and learn the new $f(g, h)$ on this set.

Many variations of the algorithms can be developed. In particular, different sampling mechanism can be used to create the data set learning function f, and different forms of f can be assumed.

Any relevant variables may be identified and used in the models. In the situation of multiple channels and retargeting, user actions from different devices may be included as part of the user actions from different channels.

In one implementation, the utilities 301 can be derived as following. A set of buying and selling decisions together may result in a match between an adj and the ad opportunity i at a given time t. Quality of the decision is measured by a utility function $u_{ij}$, which quantifies the business impact of ad j served to ad opportunity i at given time t. Examples of utilities include total revenue, margin for platform operators or sellers, total number of events such as clicks, and conversions for buyers.

Utilities may be associated with the outcome of serving an ad associated with a tractable event, X. Examples of events are clicking an ad, downloading an App to a mobile device, or other types of conversion. Likelihood of that event X happens is measured by $XRate_{ij}(t)$, which may be modeled by a score such as the probability that event X happens given the data associated with i. For example, if the cost associated with the occurrence of the event to advertiser is $CPX_j$, a platform operator may use revenue $CPX_j*XRate_{ij}$ as a utility. Alternatively, advertiser may prefer to use $XRate_{ij}$ or $XRate_{ij}/CPX_j$ as a utility.

Furthermore, different utilities may be used in association with different decisions, and at different stages of campaigns. For example, in some implementations, lifetime value of users (i.e., a prediction of the net profit attributed to the entire future relationship with the users) might be used as a utility function for all devices and channels for the device and channel allocation decisions. Clicks, taps, views, and conversions may be used for making decisions with individual channel or device. In some implementations, such as App download campaigns or other direct marketing campaigns, the same metrics such as conversions may be used for all devices and channels.

A decision associated with each individual adj can be measured on all ad opportunities $$R(T, d_j) = \sum_i \int_0^T u_{ij} I(d_j) P(i, t)(t) A(i, t) dP(X|i) dt,$$

where $R(T, d_j)$ is the utility measurement over all ad opportunities i over time $[0, T]$, T is the time horizon over which the effect of the ad is measured, and $d_j$ is the decision to be taken given at system state (i, j, $X_{ij}$). The reference to i is dropped for the simplicity of notation, with the understanding that decision is a function of the full system state (i, j, $X_{ij}$). For any instant time t, an optimal decision is $d_j=d_j(i, t)$ that maximizes $R(T, d)$. It is noted that technically this is a reinforcement learning problem in the context of machine learning or optimal control. But there is no general applicable solution to the problem that is computationally feasible and can be generalized to unknown states, both because the size and complexity of state space, and the dynamics are unknown. The remainder of the disclosure describes methods and system for providing different forms of optimal decisions.

Further, decision for a cohesive group of ads may be designed for the same user across different inventory devices and channels, and optimality of different paths allocation, path=$\{j_1, j_2, \ldots, j_m\}$ may be measured by aggregating utility for the path:

$$R(T, d_{path}) = \sum_k \sum_{i_k} \int_0^T u_{ij} I(d_{j_k}; Match\ j_k\ to\ i_k) P(i_k, t) dP(X_{j_k}|i_k) dt.$$

And the total utility can be computed as the sum over all or a portion of ad requests and ads under management:

$$R(T, \{d\}) = \sum_{ij} \int_0^T u_{ij} I(\text{decisions } \{d\}) P(i, t) A_i(t) dP(X_j|i) dt,$$

where Ai(t) is the amount of inventory indexed by i that comes at time t, and j summed over the campaign portfolio of interest, I( ) and indicator function, and {d} is a decision including a specific path. For example, a platform operator's portfolio would be all the ads that run on the platform, and a brand portfolio for channel allocation would be all the ads associated with a particular brand. The optimal decision for a given path is then represented by a vector of decisions $\{d_k\}$, with each element of the vector representing individual states listed in an order of ad opportunity $(i_1, i_2, \ldots, i_m)$ on the path.

In one implementation, an optimal decision may be formalized and quantified as maximizing the total expected utility subject to given constraints. As a way of illustration, optimal buying decisions for a given campaign may be achieved by buying the right amount of suitable ad opportunities for each ad campaign form an ad portfolio. The optimal buying may lead to the most total conversions, subjecting to given amount of budget. Thus, the optimal decision problem is to identify right ad opportunities to buy or win the bid in case of RTB.

The total utility can be computed as the sum over all ad requests and ads under management:

$$R(T, D, BP) = \sum_{ij} \int_0^T u_{ij} I(D; \text{Bid on } i \text{ for } j) *$$
$$I(\text{Wining Bid with Price } BP) A_i(t) P(i, t) dP(X_j) dt,$$

with $A_i(t)$ being the amount of inventory indexed by i that is available at time t, P(i, t) the distribution of ad opportunity i, and $P(X_j)$ as the probability distribution of event $X_j$, j is summed over the campaign portfolio of interest, and I( ) as an indicator function. For example, a platform operator's portfolio would be all the ads that run on the platform, and a brand's portfolio for channel allocation would be all the ads associated with a particular brand. It is understood that the above integral may be discretized over time and represented as a sum function over a set of time points within the time horizon $[0, T]$. And the optimal solution for decision D at any time t is solved as $(D, BP)=argmax\_R(T, D, BP)$ with the integral starting at time interval [t, T] as a state variable at time t, instead of $[0, T]$. The reference to time t is dropped in the disclosure for the clarity of description.

Referring to the above formulation, XRate may be chosen so that the utility is a function of the partial state variable $XRate_{ij}$ and $BP_{ij}$. Further, a real-time optimal bidding decision D may be computed as a function, for any instant of time t, $D=D(XRate_{ij}, A_i)$, which may further be computed as a function of data attributes that describe the current ad request. The data attributes may include user identifiers, media context information, user location information, and time, as well as data attributes describing each ad j. Similarly, pricing decision may be made as $BP_i=BP_i(XRate_{ij}, CP_i)$.

Decisions may be made for various time horizons, devices, and channels. For example, at longer time horizon, advertisers may need to decide which devices and channels to use to interact with which user, and how much budget to allocate to each types of devices and channel, how many impressions to buy for a given set of users for different devices and channels, and over what time duration.

The same or different utility may be used for the same set of campaigns. For example, for a brand advertiser, live time value (LTV) may be used to measure the total impact on all campaigns across devices and channels for cross-channel decisions and for budget allocation decisions. The conversion rate or the number of conversions may be used for programmatic buying decisions when buying individual impressions from mobile or desktop channel. The conversion rate may help optimize decisions such as whether or not to bid for each ad request, on which user, context categories, location, at what price in order to meet the campaign goals.

Further, constraints might be established for budget for each ad j or a group of ads and for the availability of inventory i or groups of ad slots which may be specified by data attributes associated with index i.

Thus, optimal decisions may be created, updated, and evaluated by associating ad inventory with proper parameters, and determining the trade-offs between utilities that measure performance, transaction price, and amount traffic for each index level. In particular, the finest index may involve detailed user attribute at individual user, media context, physical location, device, network, time band, and other parameters describing the inventory, and the higher level may involve devices and channels. Optimality at different granularity levels may be connected together by tracking interactions at user level across devices, media context, and channels, and aggregating the utility measurements from the user level to build higher inventory index granularity.

Figure 4:
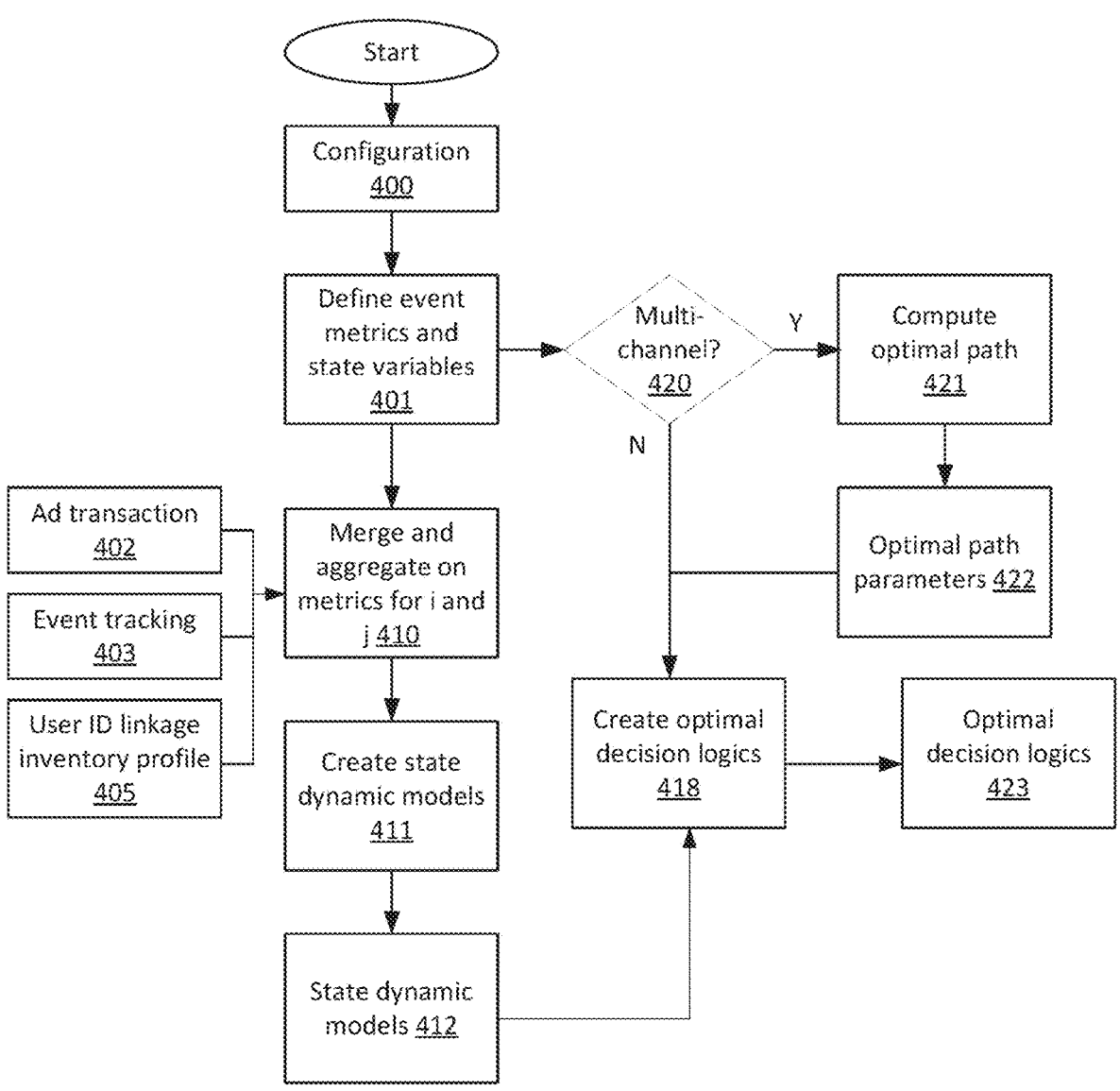
FIG. 4 illustrates a process flow for creating decision logics based on empirical data according to an implementation of the present disclosure.

FIG. 4 illustrates a process flow for creating decision logics based on empirical data according to an implementation of the present disclosure. At 400, optimality of the decision logics may be measured as specified in configuration data. Time window for optimization may also be specified as part of configuration data 400. At 401, ad event metrics and state variables may be defined based on configuration data. The state variables may include attributes for addressing the ad opportunities in real-time. At 410, ad transaction data 402, event tracking data 403 for a given time window, and user identity linked to inventory profiles 405 may be merged and aggregated over ad opportunity indices i and ad indices j. At 411, system dynamics may then be modeled in terms of XRate, pricing, and traffics. At 412, the models may be saved as data files and used to predict events, traffic, pricing, and others in real-time time based on historical transaction data. At 418, the state dynamics models and state can then be used together with transaction data to create decision logics.

At 420, the model may decide whether an ad should be run across multi-channels. A channel includes different types of devices or media that are used to connect to the same user to achieve a goal. Each channel may be associated with the same event or different events. Different tracking systems may be used to collect the event data, and later link the events to the same user. The channel may be a classification of media context or device, or a mixture of content and devices. Channels may be identified and the combination of channels that are used in a sequence of events relating to a user is defined to be a path to the user. At 421, one or more utility functions can be used to compare the impact of different channels to find the optimal path across channels, where each utility function may be associated with a channel. At 422, the optimal path parameters may be provided for creating optimal decision logics at 418. Examples of optimal path parameter may include budget to be allocated to different channels, and examples of a common utility may include a conversion metric. The following sections describe in details of how the optimization logics can be created.

The total utility R(T, D, BP) may be the same or substantially similar as discussed above. Additionally, each ad or groups of ads may subject to budget constraints, and all the ads are subject to the traffic volume constraints. For example, the following constraints might be imposed, with $x_{ij}(t)$ denoting the amount of winning bids for adj on inventory i at time t, which may be discretized, $$\sum_i CP_i(t)x_{ij}(t)dt \le B_j(t) \text{ and } \sum_j x_{ij}(t) \le A_i(t).$$

Referring to the above formulation, since the utility is a functional of the state $XRate_{ij}(t)$, a real-time optimal bidding decision D may be computed as a functional, $D=D(XRate_{ij}, A_i)$, which may further be computed as a function of data attributes that describe the current ad request which is a sample of i, comprising user, media contextual, location, and time variables, as well as data attributes describing each ad j. Similarly, pricing decision may be made as $BP_i=BP_i (XRate_{ij}, CP_i)$.

For each fixed j, the solution that optimizes the total utility is the one selecting the proper set of i to bid and win in a given time horizon. In one implementation, a utility is measured in terms of ad events, and decisions that maximize the total trading utility may be achieved by assigning a scoring function to each pair of (i, j) The score function can be defined using system dynamics involving $XRate_{ij}$ computed in real time, and the decision can be expressed in the form of a threshold on the score function. For example, the decision can be a ranking function $LR_j(r)$ that may be XRate or a transformation thereof with some additional described properties. When a value of the score function exceeds the threshold, a bid is made for the ad with a chosen price. The threshold controls the overall performance of the campaigns as measured by the utility and $XRate_{ij}$ directly. The bid decision may result in an average of percentage of ads responsive to X event happening. It is an optimal decision in the sense that the likelihood that the generation of a wrong bid is made minimal among all the decisions that have the same success rate.

When many bidders compete for an ad inventory in an auction, setting the bid price by a buyer may control the percentage of wins. A relation between the percentage of winning bid and the bid price may be established based on historical data. The total utility for a given adj may be controlled by setting the performance and price for each inventory source i. The total spending for winning ad bids may be predicted.

A ranking function LR may be chosen so that utility changes in the same direction. For example, a utility may be a monotonically increasing function of LR, and thus optimal distribution for each ad j can be found by selecting preferred a trade-off on the average (and/or total utility) and the amount of ad opportunities to purchase, or a trade-off between the average (and/or total utility) and the equivalent and/or total cost. Such trade-offs corresponds to a set of threshold parameters in the decision logics using the ranking function LR.

For example, a processing device may execute real-time decision logic to select a suitable ad opportunity for each ad j based on the following. The processing device may, for a given time window in the interval [0,T]:
1. build a table of schema for a time window, where the table of schema may be constructed as: [j, I, Utility, TotalUtility, ExpectedUtility, LR, NumberImpressions, CP, AmountOfAdOpportunities, Cost];
2. create Expected Utility (LR) graph or Traffic (LR) graph;
3. sort the table based on LR or utility, and select the top inventory slots i at expected utility cut-off point (or cost or traffic cut off point).

In one implementation, the total amount of budget may be allocated to a campaign or a portfolio of campaigns according to an optimal allocation $x_{ij}(t)$. The function $x_{ij}(t)$ may be used to specify the number of impressions on the graph (LR graph of expected utility or traffic) to produce an optimal threshold of $LR_{ij}$. The granularity of discretization on t can be chosen based on a number of practical considerations such as, for example, a trade-off between computing resources, velocity of state dynamics change, and budget change.

To account for future performance of inventory, $XRate_{ij}$ may be used as a metric along with formulation of constraints and objective functions in solving for the optimal allocation of budget. When there are multiple qualifying ads for the same ad opportunity, a strategy to select final ads may take into considerations such as priority, delivery scheduling, along with performance optimization goals as part of the above optimization process.

The same optimization process may be used for each advertiser or publisher on the same system, each having its own optimization configurations. A platform may further decide on which advertiser based on external considerations beyond decision optimization.

The decision framework may choose utilities to drive different ad goals, such as optimal performance in terms of one or more track table metrics such as clicks, conversions, minimal cost, and bet value in terms of price and cost ratio. By choosing the right utilities, decisions for different optimization goals may be found using the framework with same process.

In some implementations of the present disclosure, a combination of user devices and media channels may be employed to provide ads to a same user in order to improve overall performance. The optimal combination of user devices and channels may be learned empirically within the decision framework by determining a device and channel combination that maximizes the total utility with minimal cost.

A common utility is specified to measure the overall performance over device and channel combinations for each user or groups of users. Examples of common utility include revenue, margin, and total number of conversions, etc. Each unique device and channel combination may be defined as an ordered sequence of ads on specific device or media channel, $$\text{Path} = \text{Sequence of } x_j, \text{ and } x_j = (Adj \text{ on Channel}_j)$$

For example, if two channels $\{d_1, d_2\}$ are used, a path may include $d_1, d_2, (d_1, d_2),$ and $(d_2, d_1),$ where $d_1$ and $d_2$ are devices associated with a user and the channels to provide media the user, $(d_1, d_2)$ and $(d_2, d_1)$ may represent paths associated with these devices associated with the user.

A path identifier may identify the path. All the possible combinations of paths are obtained by permutation of the elements in the set {PathIds}. In some implementations, only a subset of all paths may be pursued. Selection of the subset of paths may be based on a priori knowledge of the effectiveness of each channel in association with goals of interaction (i.e., aware, discovery, consideration, and conversion).

The total utility (for example, probability of conversion) may be computed in terms of a path and common data attributes u associated with a user. For example a logistic regression model, TotalUtility (path, u) may be built, with u representing data attributes in describing users across channels.

Non-predictive attributes may be trimmed from the model, and attributes used by utility (e.g., conversion) with respect to a path can be specified as the proportion of utility accounted for by that path (e.g. remaining path variable in the model). Thus, attributes may be associated with a path (vs. a channel).

Other allocation strategy may be obtained by tabulating for each path and user segment metrics including utility, cost, the number of impressions, the number of users and other factors. An explicitly optimal budget allocation can also be obtained by solving the constrained optimization problem:

$$\text{Maximize} \sum\nolimits_{path} Util(\text{Path}) x_{path},$$

subject to the cost constraints, $$\sum\nolimits_{path} \text{Cost}(\text{path}) x_{path} \leq \text{TotalBudget},$$

and traffic constraints, $$\text{For each path, } x_{path} \leq \text{AvailableInventory}(\text{path})$$

Further, channels may be optimally selected at the user level, resulting in decisions that specify which user to contact for each path in UserGroup(PathId). A score may be assigned per path and per user: (PathId, userId, PathUserScore), where PathUserScore can be a utility as a function of user data attributes. Path allocation can then be obtained by aggregating sores of each path at user level:

$$\text{Utility}(PathId) = \sum_{u \in UserGroup(PathId)} Utilit(PathId, u)$$

A closed form approximate solution can be obtained by attribution associated with individual channel. For example, the attribution may be the proportion of utility attributed to that channel, which may be computed as a sum of the utility over all predictive paths that contains the channel.

Optimal path may further be realized through allocating budget to different channels and devices, along with the information of when and which device or channel associated with a user should a particular advertiser buy and the proper price for the purchase; in the case of a portfolio of campaigns, which ad and which campaign should answer to a particular ad request at any instant of time; in the case of bucketed sales, which buckets and what price should be bought for each campaign.

A total budget of an advertiser can be allocated as proportional to the contribution of each path at path level, or at channel level. The matching of the ad to a channel may be represented as $$x_j = (Adj \text{ on Channel}_j)$$

and timing may be learned by assigning random group of (pathId, userId) to different channels to run the campaigns, and by modeling the state dynamics variables such as XRates using the allocation $\{X_j\}$ as predictors.

The incremental improvement in utilities through cross-channel interactions may be captured in the incremental XRate value. When there are no cross-channel interactions, the incremental XRate value may stop increasing.

To arrive at decision rules on the type of channels and devices, the total utility may be computed by aggregating the utility over ad opportunity i and portfolio of ads j grouped over appropriate channel and device variables. The output of optimal budget allocation can then be used as input for optimizing decision for the channels and devices. To arrive at optimal decisions at the level for each device and channel, ad opportunity i is then indexed at the same granularity level that an ad request is bucketed for buying or selling.

Implementations of the present disclosure may also optimize decisions for sellers or platform representing sell side (e.g., ad exchanges). The decision may be implemented for different pricing models such as, for example, cost per impression, cost per click, and cost per conversions. For example, revenue may be chosen as the utility.

The inventory source may include direct publishers and external publishers, and there may be multiple goals including revenue goals and margin goals. Explicit optimal trade-offs may be made in assigning an ad to an ad opportunity.

A global revenue and margin control provided by an operator of the decision framework may determine the individual campaign parameters that may allow the realization of revenue (utility) goals while keeping margin in a given range (typically not optimized)—namely, given an overall revenue (utility) goal and a lower bound on the margin to determine a campaign that meets the revenue and margin requirements.

The solution may be generated based on the inventory sources. For example, for direct publisher inventory, since revenue is proportional to the margin, optimizing the revenue is equivalent to optimizing the margin. For inventory from exchanges, there is a trade-off to be made as described in the following.

The trade-off may be illustrated by an example in which the goal is to maximize the margin of a campaign. Any increment in revenue therefore may be at the expanse of reduced margin. An optimal trade-off between revenue and margin may be found for a given margin increment or vice versa.

Let R be the revenue goal, and $R_j$, $M_j$ respectively be the increment in revenue and decrement in margin for the next percentile, and $y_j$ be the amount of increment for ad order j. The optimal solution can be obtained by the solving the optimization problem:

$$Minimi_y \sum_j \Delta M_j y_j \text{ Subject to } \sum_j \Delta R_j y_j$$

It can be shown that the solution to the above problem is to set J*=Arg Min$_j\{\Delta M_j/\Delta R_j\}$, resulting in minimal margin loss.

Figure 5:
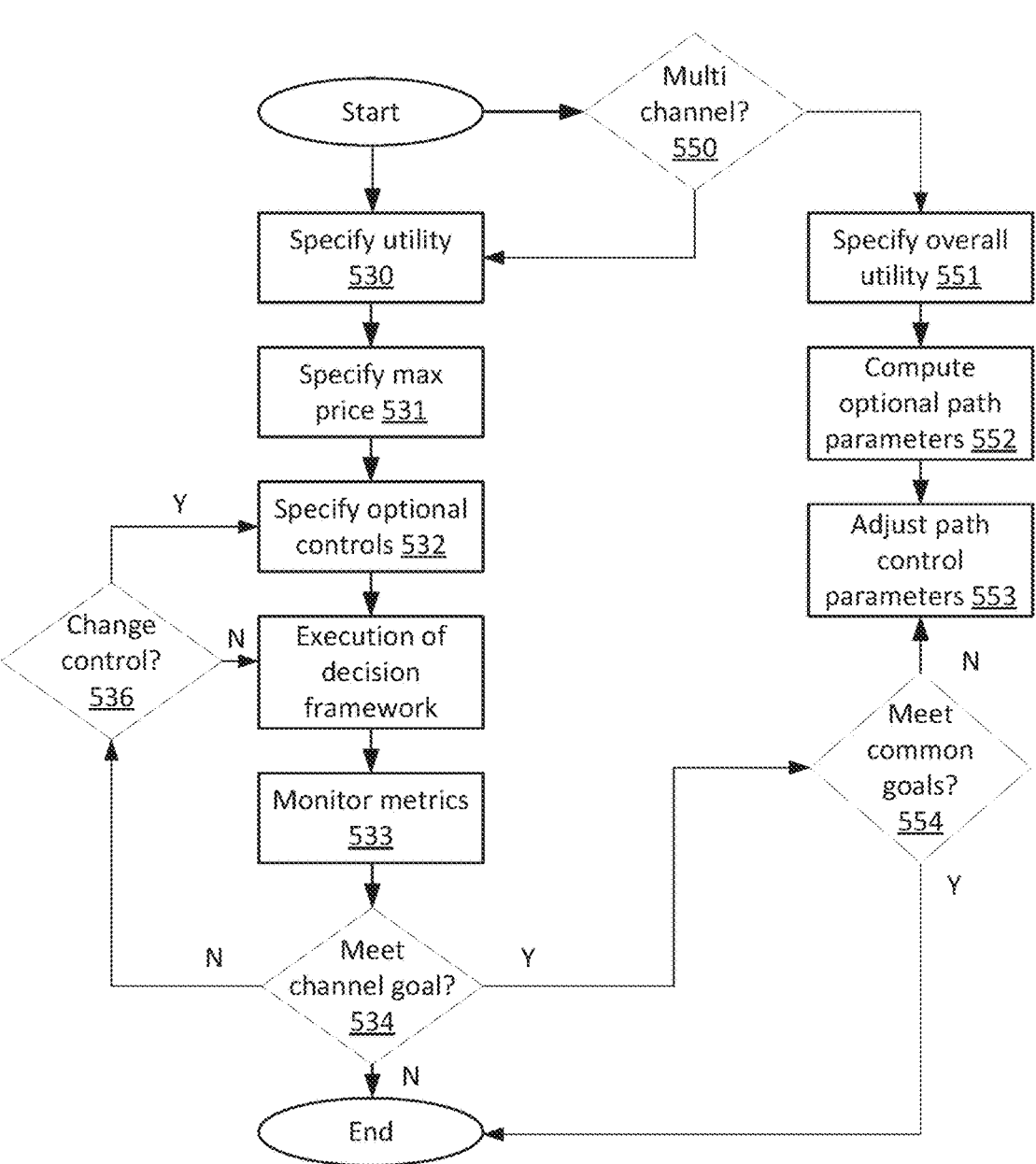
FIG. 5 illustrates a process flow for using the decision logics for a media buy according to an implementation of the present disclosure.

FIG. 5 illustrates a process flow for using the decision logics for a media buy according to an implementation of the present disclosure. Referring to FIG. 5, a workflow 500 may use the optimal strategy for buying media for a campaign, where one or more channels may be used for the same campaign. At 550, the workflow may determine whether one or more than one channel is used for the campaign. At 551, if multiple channels are used in the campaign, a common utility goal may be specified for all campaigns. At 552, based on the input, the decision engine may compute the optimal allocations parameters. At 553, path control parameters may be optionally adjusted to meet the goals. For example, there might be preference towards a subset of channels. At 530, the behavior of the system may be further controlled by specifying different utilities and/or utility goals for each channel. In yet another implementation, an advertiser may not want to make distinctions among channels. For example, in a simple branding campaign, the advertiser may not want to track the interactive effects of different channels. In this type of situation, a single utility goal is specified in box 530. In addition, the operator may specify a price range, for example at 531, including a maximum price to pay for a bid, or want secure a bigger chance of winning a bid.

In one implementation, a quantifiable goal of campaigns may be specified at 530 in the form of average utility such as, the expected conversion rate in the case of conversion campaigns. The operator may further specify the maximum price, and the total budget, along with additional controls at 532 taking into consideration other constraints. The system can work autonomously to make buying decisions that meet the utility goal and campaign objectives.

Performance of decision parameters may be monitored. At 533, an operator may introduce additional knowledge (e.g., via the control interface 215) that is not captured by the empirical data. At 536, the decision framework may provide a user interface for the operator to systematically introduce knowledge and optimize the decisions based on empirical evidence.

The decision framework may log data used by the state modeling and optimization component to evaluate the performance of the parameters. The state models and decision parameters may then be updated based on preset schedule or monitor results.

At 534, the decision framework may make a subsequent determination of whether the multi-channel goal has been met. If not, at 536, the decision framework may change the control parameters. If the multi-channel goal has been met, at 535, the framework may determine if there are multiple channels leading to a user. If there are, at 554, the decision framework may check whether the common utility has reached. If the common utility has not met, at 553, path control parameters may be optionally adjusted to meet the goals.

In one implementation, a graphic user interface may be used to receive control parameters for the decision logics processor. The control parameters may include proper threshold values and trade-offs. Additional control parameters may include price tolerance, state dynamics learning rate, spending pacing and others. Table 1 illustrates the type of control and the level (e.g. ad or ad opportunity) where the control is applied. Each parameter in the table represents a type of control.

TABLE 1

| Parameter | Function | Level |
|---|---|---|
| Capture rate | Percentage of events captured, and control error rate | AdId |
| Overbid (Bid Price) | Addition to bid price | AdID |
| Throttling Rate control j | Adjust auto throttling rate for learning new models | AdID |
| Throttling Rate | Percentage of request to bid on from given inventory source. Controls against volume of inventory to buy (to meet campaign and optimization goals, and guard against spikes )f | InvId |

TABLE 1-continued

| Parameter | Function | Level |
|---|---|---|
| Pacing controls:<br>{ W(t), Ceil(t) } | Add control on daily spend, spread of spend over given period of time by modifying the computed budget goals (which optimizes the portfolio of campaigns) | AdId |
| Margin floor | Controls lost in margin in rev/margin utility | AdId |
| Utility Goal | Controls overall goal value | global campaign portfolio at seat level |
| Rev/Margin Delta | Rev/Margin adjustment control | Campaign portfolio level |

Figure 6:
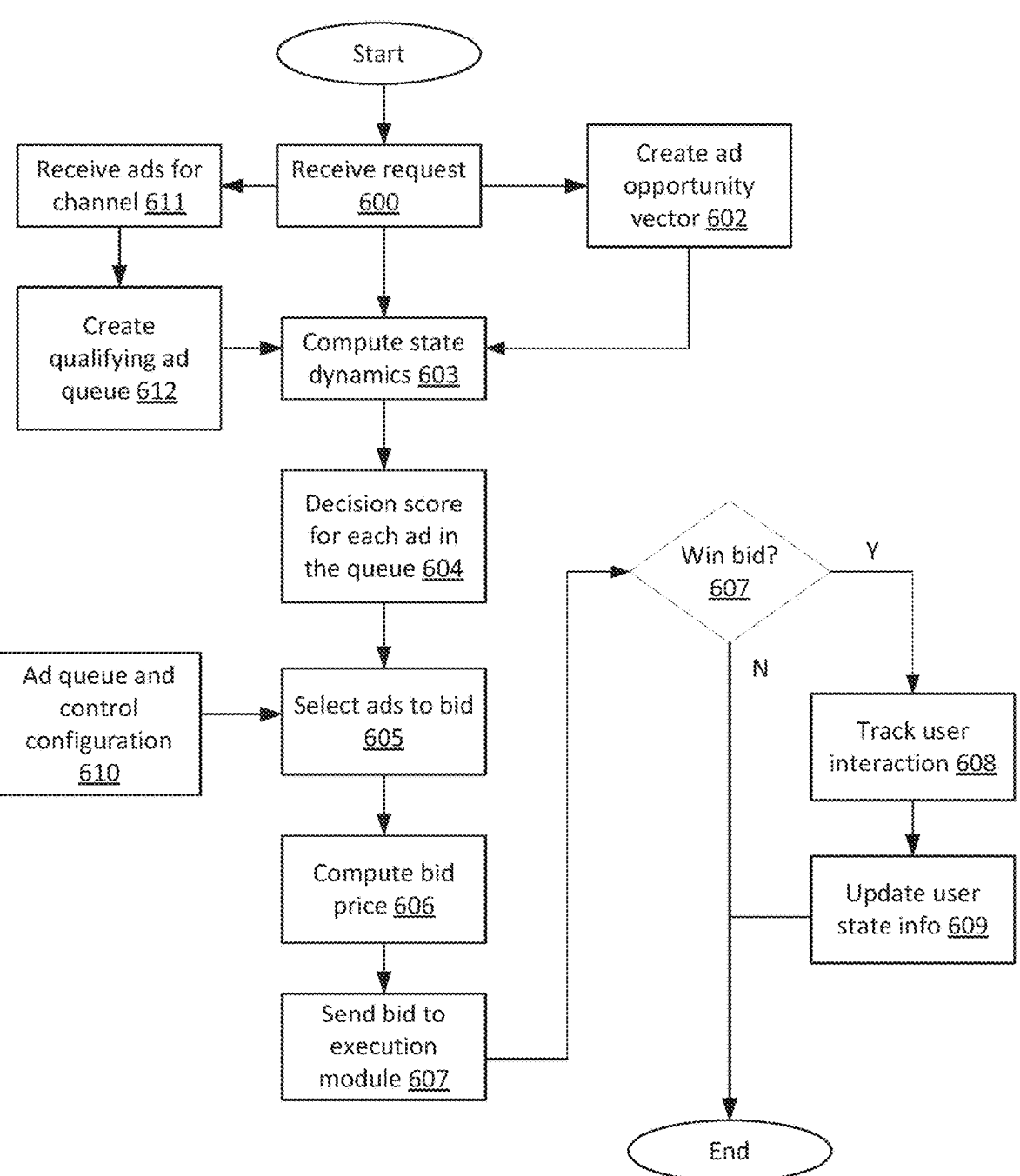
FIG. 6 illustrates a real-time process in selecting the matching ads according to an implementation of the present disclosure.

FIG. 6 illustrates a real-time process in selecting the matching ads according to an implementation of the present disclosure. At 600, an ad request may be received from any of the sources. At 602, the decision framework may create an ad opportunity vector that describes the ad request. The vector may include information contained in the request. The information may be used to identify relevant attributes with respect to a user, including the context, location, or device from a different source. At 611, the decision framework may retrieve active ads available for channels from sources such as, for example, an ad inventory. At 612, part or all of the information may be used to filter the active ad pool to identify a set of qualifying ads. This process may involve predefined filtering on matching as well as initial scores on likely performance. At 603, the decision framework may compute state dynamics, the state dynamics including prediction of likely user interactions on various metrics. At 604, each ad may be assigned with a score as determined by the decision logics, the specific preferences specified by control and configuration information (at 601), and state dynamics information. The state dynamics information may include priorities of each ads or group of ads, remaining budget, and ad inventory allocation among the pool of ads that may be used to select the final set of ads for the opportunity. At 610, ad request and configuration data may be provided from an RTB source. At 605, ads from RTB source may be selected to bid for an ad opportunity. At 606, the configuration and state dynamics info may further be used to compute a bid price. At 612, the resulting information comprising the ad information and bidding price may be sent to the execution engine to participate in the bid at the exchange. At 607, if the bid from the decision framework receives a winning notification, the decision framework may provide the ad to the user device over the channels and devices associated with the user. At 608, the user's further interaction with the ads may be tracked. The tracked information may become empirical data that may be used to update the state dynamics at 609.

FIG. 8 depicts a flow diagram of a method 800 for optimally providing an ad to user devices according to an implementation of the present disclosure. Method 800 may be performed by processing devices that may comprise hardware (e.g., circuitry, dedicated logic), computer readable instructions (e.g., run on a general purpose computer system or a dedicated machine), or a combination of both. Method 800 and each of its individual functions, routines, subroutines, or operations may be performed by one or more processors of the computer device executing the method. In certain implementations, method 800 may be performed by a single processing thread. Alternatively, method 800 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 800 may be performed by a processing device executing the decision framework 114 as shown in FIG. 1.

Referring to FIG. 8, at 802, the processing device executing the decision frame may receive a request comprising a plurality of attribute values associated with an opportunity to place an ad on one or more devices associated with a user.

At 804, the processing device executing the decision frame may generate a state dynamic model comprising a plurality of state variables based on the plurality of attribute values associated with the opportunity.

At 806, the processing device executing the decision frame may determine a plurality of utility functions, wherein each one of the plurality of utility function is determined based on at least one of the plurality of state variables.

At 808, the processing device executing the decision frame may calculate a decision based on the plurality of utility functions, wherein the decision comprises a selection of an ad from an inventory as an optimal match to the ad opportunity.

At 810, the processing device executing the decision frame may cause to provide the ad to a selection of the one or more devices.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein (e.g., instructions of the decision framework 114). The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

(a) receiving, by a processing device executing a decision framework, a request comprising a plurality of attribute values associated with an ad opportunity to place an ad on one or more devices and device types across multiple different media channels associated with a user;

(b) generating a state dynamic model that characterizes a state of an advertising system via states in a state-space representation, wherein:

(i) the state dynamic model comprises information needed to make a transaction decision including a plurality of state variables that represent the ad and the ad opportunity;

(ii) the plurality of state variables are used to describe and address the ad opportunity and the ad and state dynamics specify how the plurality of state variables are related together for calculating a runtime decision;

(c) determining, in a decision logic creator module, a plurality of utility functions, wherein each one of the plurality of utility functions is determined based on at least one of the plurality of state variables, wherein the plurality of utility functions measure an effect of ad placement as a function of advertising metrics, and wherein different utility functions are determined for advertisers and media content providers;

(d) calculating the runtime decision based on the plurality of utility functions, wherein the runtime decision comprises a selection of an ad from an inventory as an optimal match to the ad opportunity, and wherein the optimal match is determined in real time for the advertisers and the media content providers;

(e) providing the ad to a selection of the one or more devices;

(f) tracking performance data for interactions with the provided ad across all of the one or more devices and the multiple different media channels;

(g) dynamically improving performance of the decision framework using the tracked performance data and a feedback loop back, wherein the decision framework dynamically generates optimal decisions in an automated manner based on the tracked performance data, and wherein the decision framework autonomously calculates runtime decisions that updates the state dynamics and creates new runtime decision logics via the feedback loop; and (h) automatically performing, via programmatic advertising through machine to machine interfaces, real-time buying and selling of ad opportunities based on the updated state dynamics and new runtime decision logics.

2. The method of claim 1, wherein the plurality of attribute values comprise at least one of a user identifier, a media identifier, a location identifier, or an ad spot identifier, wherein the media identifier is associated with at least one of a publisher, an application for a mobile device, a web page, a video source, or a media segment, and wherein the user identifier is associated with at least one of a user device identifier or a media channel identifier.

3. The method of claim 1, wherein the ad opportunity is associated with at least one of placing an individual ad or placing a bucket of ads on the one or more devices.

4. The method of claim 1, wherein the plurality of state variables are associated with representing a plurality of ads, a plurality of opportunities, a plurality of events, a plurality of state dynamic variables, and a plurality of scores, and wherein the plurality of scores are a plurality of probabilities predicting the plurality of events relating to user interactions with respect to the plurality of ads when the plurality of ads are placed on the one or more devices.

5. The method of claim 4, wherein the plurality of scores comprise at least one of a probability of clicking an ad by the user, a probability of an ad conversion, or probabilities of traffic associated with buckets of ads.

6. The method of claim 1, wherein the plurality of utility functions are specified for at least one of a buyer of the opportunity, a seller of the opportunity, or a media content provider, and wherein the plurality of utility functions are associated with at least one of a budget of the buyer, a media inventory, a price movement with respect to the request, a probability of a user action, or a probability of a competing ad campaign for an ad portfolio.

7. The method of claim 1, wherein calculating the runtime decision comprises employing a plurality of decision rules to calculate the runtime decision based on the plurality of utility functions and a set of control parameters, and wherein the set of control parameters are received at a user interface.

8. The method of claim 7, wherein the plurality of control parameters comprise at least one of an average click rate, an average conversion rate, a revenue goal, a margin goal, a profit margin tolerance, an ad price range, ad placement priorities, an overbid margin, a throttle rate, a pricing tolerance, or trade-offs among control parameters.

9. The method of claim 7, wherein at least one of the plurality of utility functions comprises a score representing a probability associated with occurrence of an event, and wherein a representation of the runtime decision comprises comparing the score with a threshold parameter.

10. The method of claim 7, further comprising:

responsive to providing the ad to the selection of the one or more devices, tracking user interactions with the ad placed on the selection of the one or more devices;

recording the user interactions in a transaction log stored in a storage device; and updating the plurality of decision rules based on the user actions.

11. The method of claim 1, wherein calculating the runtime decision comprises calculating the runtime decision using the user data stored in the transaction log associated with a time window prior to a current time window in which the runtime decision is being calculated, wherein the time window is a sliding window along a time axis.

12. The method of claim 1, wherein calculating the runtime decision comprises determining the selection of the one or more devices based on the plurality of utility functions, wherein the selection of the one or more devices comprises at least one of a mobile device, a desktop device, and a networked television set, and wherein the selection of one or more devices comprises at least one media channel associated with the user.

13. The method of claim 1, wherein calculating the runtime decision comprises making a tradeoff between a revenue utility function and a profit margin utility function.

14. A system comprising:

a memory; and a processing device, communicatively coupled to the memory, executing a decision framework to:

receive a request comprising a plurality of attribute values associated with an ad opportunity to place an ad on one or more devices and device types across multiple different media channels associated with a user, generate a state dynamic model that characterizes a state of an advertising system via states in a state-space representation, wherein:

the state dynamic model comprises information needed to make a transaction decision including a plurality of state variables that represent the ad and the ad opportunity;

the plurality of state variables are used to describe and address the ad opportunity and the ad and state dynamics specify how the plurality of state variables are related together for calculating a runtime decision;

determine, in a decision logic creator module, a plurality of utility functions, wherein each one of the plurality of utility function is determined based on at least one of the plurality of state variables, wherein the plurality of utility functions measure an effect of ad placement as a function of advertising metrics, and wherein different utility functions are determined for advertisers and media content providers;

calculate the runtime decision based on the plurality of utility functions, wherein the runtime decision comprises a selection of an ad from an inventory as an optimal match to the ad opportunity, and wherein the optimal match is determined in real time for the advertisers and the media content providers;

provide the ad to a selection of the one or more devices;

track performance data for interactions with the provided ad across all of the one or more devices and the multiple different media channels;

dynamically improve performance of the decision framework using the tracked performance data and a feedback loop back, wherein the decision framework dynamically generates optimal decisions in an automated manner based on the tracked performance data, and wherein the decision framework autonomously calculates runtime decisions that updates the state dynamics and creates new runtime decision logics via the feedback loop; and automatically perform, via programmatic advertising through machine to machine interfaces, real-time buying and selling of ad opportunities based on the updated state dynamics and new runtime decision logics.

15. The system of claim 14, wherein the plurality of attribute values comprise at least one of a user identifier, a media identifier, a location identifier, or an ad spot identifier, wherein the media identifier is associated with at least one of a publisher, an application for a mobile device, a web page, a video source, or a media segment, and wherein the user identifier is associated with at least one of a user device identifier or a media channel identifier.

16. The system of claim 14, wherein the ad opportunity is associated with at least one of placing an individual ad or placing a bucket of ads on the one or more devices.

17. The system of claim 14, wherein the plurality of state variables are associated with representing a plurality of ads, a plurality of opportunities, and a plurality of probabilities predicting events relating to user interactions with respect to the plurality of ads when the plurality of ads are placed on the one or more devices.

18. The system of claim 14, wherein the plurality of utility functions are specified for at least one of a buyer of the opportunity, a seller of the opportunity, or a media content provider, and wherein the plurality of utility functions are associated with at least one of a budget of the buyer, a media inventory, a price movement with respect to the request, a probability of a user action, or a probability of a competing ad campaign for an ad portfolio.

19. The system of claim 14, wherein to calculate the runtime decision, the processing device is further to employ a plurality of decision rules to calculate the runtime decision based on the plurality of utility functions and a set of control parameters received at a user interface.

20. The system of claim 14, wherein to calculate the runtime decision, the processing device is further to determine the selection of the one or more devices based on the plurality of utility functions, wherein the selection of the one or more devices comprises at least one of a mobile device, a desktop device, and a networked television set, and wherein the selection of one or more devices comprises at least one media channel associated with the user.

* * * * *